(12) United States Patent
Xue et al.

(10) Patent No.: US 10,588,126 B2
(45) Date of Patent: *Mar. 10, 2020

(54) METHOD FOR EFFICIENT CHANNEL ESTIMATION AND BEAMFORMING IN FDD SYSTEM BY EXPLOITING UPLINK-DOWNLINK CORRESPONDENCE

(71) Applicant: Intel Corporation, Santa Clara, CA (US)

(72) Inventors: Feng Xue, Redwood City, CA (US); Qinghua Li, San Ramon, CA (US); Yuan Zhu, Beijing (CN)

(73) Assignee: Apple Inc., Cupertino, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/804,360

(22) Filed: Nov. 6, 2017

(65) Prior Publication Data

US 2018/0110049 A1 Apr. 19, 2018

Related U.S. Application Data

(63) Continuation of application No. 14/109,211, filed on Dec. 17, 2013, now Pat. No. 9,814,037.
(Continued)

(51) Int. Cl.
*H04W 72/02* (2009.01)
*H04W 72/04* (2009.01)
(Continued)

(52) U.S. Cl.
CPC ........ *H04W 72/0446* (2013.01); *H04B 7/024* (2013.01); *H04B 7/0452* (2013.01);
(Continued)

(58) Field of Classification Search
CPC ............. H04W 76/02; H04W 72/0446; H04W 56/0005; H04W 72/02; H04W 16/14;
(Continued)

(56) References Cited

U.S. PATENT DOCUMENTS 5,471,647 A * 11/1995 Gerlach ............... H01Q 3/2605
455/103
8,160,976 B2 4/2012 Dwyer et al.
(Continued)

FOREIGN PATENT DOCUMENTS

CN 1728593 A 2/2006
CN 1973473 A 5/2007
(Continued)

OTHER PUBLICATIONS

US 9,635,667 B1, 04/2017, Shirani-Mehr et al. (withdrawn)
(Continued)

*Primary Examiner* — Lan-Huong Truong
(74) *Attorney, Agent, or Firm* — Kowert, Hood, Munyon, Rankin & Goetzel, P.C.

(57) ABSTRACT

A method for selecting at least one parameter for downlink data transmission with a mobile user equipment. The method is executable by a wireless communication base station having multiple antennas configured to communicate wirelessly with the mobile user equipment. The method receives an uplink probing signal from the mobile user equipment. The method determines a plurality of angles of arrival for a corresponding plurality of paths between the mobile user equipment and the multiple antennas. The method transmits a plurality of downlink probing signals directionally toward corresponding angles of arrival in the plurality of angles of arrival. Each downlink probing signal is a virtual antenna port with respect to the mobile user equipment. The method receives channel state information. The method composes at least one of a rank indicator (RI), precoding matrix indicator (PMI), or modulating and coding scheme (MCS) for downlink data transmission to the mobile user equipment.

16 Claims, 4 Drawing Sheets

Related U.S. Application Data

(60) Provisional application No. 61/841,230, filed on Jun. 28, 2013.

(51) Int. Cl.

| | | |
|---|---|---|
| *H04W 76/10* | (2018.01) | |
| *H04W 76/19* | (2018.01) | |
| *H04W 76/30* | (2018.01) | |
| *H04W 24/10* | (2009.01) | |
| *H04B 7/0452* | (2017.01) | |
| *H04B 7/06* | (2006.01) | |
| *H04W 56/00* | (2009.01) | |
| *H04L 25/02* | (2006.01) | |
| *H04L 25/03* | (2006.01) | |
| *H04W 88/02* | (2009.01) | |
| *H04W 16/14* | (2009.01) | |
| *H04W 8/00* | (2009.01) | |
| *H04W 48/16* | (2009.01) | |
| *H04L 12/18* | (2006.01) | |
| *H04W 74/00* | (2009.01) | |
| *H04W 74/08* | (2009.01) | |
| *H04W 36/02* | (2009.01) | |
| *H04W 68/04* | (2009.01) | |
| *H04B 7/024* | (2017.01) | |
| *H04J 11/00* | (2006.01) | |
| *H04L 5/14* | (2006.01) | |
| *H04W 48/12* | (2009.01) | |
| *H04W 84/18* | (2009.01) | |
| *H04W 88/06* | (2009.01) | |
| *H04W 84/04* | (2009.01) | |

(52) U.S. Cl.
CPC .......... *H04B 7/0626* (2013.01); *H04J 11/005* (2013.01); *H04L 5/1469* (2013.01); *H04L 12/18* (2013.01); *H04L 25/021* (2013.01); *H04L 25/0242* (2013.01); *H04L 25/03891* (2013.01); *H04W 8/005* (2013.01); *H04W 16/14* (2013.01); *H04W 24/10* (2013.01); *H04W 36/02* (2013.01); *H04W 48/16* (2013.01); *H04W 56/0005* (2013.01); *H04W 68/04* (2013.01); *H04W 72/02* (2013.01); *H04W 72/042* (2013.01); *H04W 74/004* (2013.01); *H04W 74/006* (2013.01); *H04W 74/0816* (2013.01); *H04W 76/10* (2018.02); *H04W 76/19* (2018.02); *H04W 76/30* (2018.02); *H04W 88/02* (2013.01); *H04W 48/12* (2013.01); *H04W 72/0406* (2013.01); *H04W 84/045* (2013.01); *H04W 84/18* (2013.01); *H04W 88/06* (2013.01)

(58) Field of Classification Search
CPC .......... H04W 88/02; H04W 72/042; H04W 72/0406
See application file for complete search history.

(56) References Cited

U.S. PATENT DOCUMENTS

| | | | |
|---|---|---|---|
| 8,170,081 B2 | 5/2012 | Forenza et al. | |
| 8,213,978 B1 | 7/2012 | Ho et al. | |
| 8,259,599 B2 | 9/2012 | Ghady et al. | |
| 8,462,688 B1 | 6/2013 | Dinan | |
| 8,547,969 B2 | 10/2013 | Watfa et al. | |
| 8,565,793 B1 | 10/2013 | Koodli | |
| 8,654,815 B1 | 2/2014 | Forenza et al. | |
| 8,682,354 B2 | 3/2014 | Zhong et al. | |
| 8,965,338 B2 | 2/2015 | Luft et al. | |
| 8,992,202 B2 | 3/2015 | Pettis | |
| 9,025,479 B2 * | 5/2015 | Gaal | H04W 24/02 370/252 |
| 9,046,591 B1 | 6/2015 | Yang et al. | |
| 9,179,328 B2 | 11/2015 | Li et al. | |
| 9,320,063 B2 | 4/2016 | Zaus | |
| 9,655,107 B2 | 5/2017 | Shirani-Mehr et al. | |
| 9,750,017 B2 | 8/2017 | Zaus | |
| 9,794,870 B2 | 10/2017 | Vannithamby et al. | |
| 9,814,037 B2 | 11/2017 | Xue et al. | |
| 2004/0014501 A1 | 1/2004 | Kuwahara et al. | |
| 2006/0007043 A1 | 1/2006 | Xin | |
| 2006/0292990 A1 * | 12/2006 | Karabinis | H01Q 3/2611 455/63.4 |
| 2007/0211813 A1 | 9/2007 | Talwar et al. | |
| 2008/0170504 A1 | 7/2008 | Petrovic et al. | |
| 2008/0260918 A1 | 10/2008 | Lai et al. | |
| 2008/0305805 A1 | 12/2008 | Mondal et al. | |
| 2009/0323841 A1 | 12/2009 | Clerckx et al. | |
| 2010/0046643 A1 | 2/2010 | Mondal et al. | |
| 2010/0054237 A1 | 3/2010 | Han et al. | |
| 2010/0056216 A1 | 3/2010 | Li | |
| 2010/0265841 A1 | 10/2010 | Rong et al. | |
| 2010/0311431 A1 | 12/2010 | Papasakellariou et al. | |
| 2010/0316034 A1 | 12/2010 | Burbidge et al. | |
| 2010/0316154 A1 | 12/2010 | Park et al. | |
| 2011/0069618 A1 | 3/2011 | Wong et al. | |
| 2011/0103305 A1 | 5/2011 | Ali et al. | |
| 2011/0143759 A1 | 6/2011 | Choi et al. | |
| 2011/0149852 A1 | 6/2011 | Olsson et al. | |
| 2011/0164668 A1 | 7/2011 | Hoek et al. | |
| 2011/0164696 A1 | 7/2011 | Choi et al. | |
| 2011/0194638 A1 | 8/2011 | Erell et al. | |
| 2011/0199986 A1 | 8/2011 | Fong et al. | |
| 2011/0216846 A1 | 9/2011 | Lee et al. | |
| 2011/0244847 A1 | 10/2011 | Mallik et al. | |
| 2011/0249637 A1 | 10/2011 | Hammarwall et al. | |
| 2011/0268101 A1 | 11/2011 | Wang et al. | |
| 2011/0275371 A1 | 11/2011 | Roger | |
| 2012/0014462 A1 | 1/2012 | Zummo et al. | |
| 2012/0071163 A1 | 3/2012 | Klingenbrunn et al. | |
| 2012/0082082 A1 | 4/2012 | Etemad et al. | |
| 2012/0120789 A1 | 5/2012 | Ramachandran et al. | |
| 2012/0128089 A1 | 5/2012 | Tsutsui | |
| 2012/0163235 A1 | 6/2012 | Ho et al. | |
| 2012/0165019 A1 | 6/2012 | Shintani et al. | |
| 2012/0252429 A1 | 10/2012 | Yoshizawa | |
| 2012/0258729 A1 * | 10/2012 | Siomina | G01S 3/28 455/456.1 |
| 2012/0275401 A1 | 11/2012 | Sun | |
| 2012/0281783 A1 | 11/2012 | Cheng et al. | |
| 2012/0322489 A1 | 12/2012 | Liu et al. | |
| 2013/0021925 A1 | 1/2013 | Yin et al. | |
| 2013/0034082 A1 | 2/2013 | Etemad et al. | |
| 2013/0039244 A1 | 2/2013 | Sun | |
| 2013/0064129 A1 | 3/2013 | Koivisto et al. | |
| 2013/0070703 A1 | 3/2013 | Yasukawa et al. | |
| 2013/0077513 A1 | 3/2013 | Ng et al. | |
| 2013/0083661 A1 | 4/2013 | Gupta et al. | |
| 2013/0083777 A1 | 4/2013 | Rydnell et al. | |
| 2013/0088983 A1 | 4/2013 | Pragada et al. | |
| 2013/0107849 A1 | 5/2013 | Park | |
| 2013/0107977 A1 | 5/2013 | Lakkis | |
| 2013/0114576 A1 | 5/2013 | Kwon et al. | |
| 2013/0121185 A1 | 5/2013 | Li et al. | |
| 2013/0153298 A1 | 6/2013 | Pietraski et al. | |
| 2013/0155962 A1 | 6/2013 | Hakola et al. | |
| 2013/0157670 A1 | 6/2013 | Koskela et al. | |
| 2013/0163457 A1 | 6/2013 | Kim et al. | |
| 2013/0201852 A1 | 8/2013 | Chou et al. | |
| 2013/0201884 A1 | 8/2013 | Freda | |
| 2013/0230081 A1 | 9/2013 | Wernersson et al. | |
| 2013/0273924 A1 | 10/2013 | Hakola et al. | |
| 2013/0288608 A1 | 10/2013 | Fwu et al. | |
| 2014/0010221 A1 | 1/2014 | Panian et al. | |
| 2014/0024386 A1 | 1/2014 | Novak et al. | |
| 2014/0043630 A1 | 2/2014 | Buser et al. | |
| 2014/0050086 A1 | 2/2014 | Himayat et al. | |
| 2014/0056246 A1 | 2/2014 | Chun et al. | |
| 2014/0098900 A1 | 4/2014 | Bayesteh et al. | |

(56) References Cited

U.S. PATENT DOCUMENTS

| | | |
|---|---|---|
| 2014/0126549 A1 | 5/2014 | Beale |
| 2014/0128092 A1 | 5/2014 | Xiong et al. |
| 2014/0133401 A1 | 5/2014 | Kaura et al. |
| 2014/0156646 A1 | 6/2014 | Brust et al. |
| 2014/0171054 A1 | 6/2014 | Cai et al. |
| 2014/0171062 A1 | 6/2014 | Fallgren et al. |
| 2014/0177683 A1 | 6/2014 | Krishnamurthy et al. |
| 2014/0177744 A1* | 6/2014 | Krishnamurthy .... H04B 7/0469 375/267 |
| 2014/0177745 A1 | 6/2014 | Krishnamurthy et al. |
| 2014/0206367 A1* | 7/2014 | Agee ............... H04W 28/0236 455/450 |
| 2014/0211673 A1 | 7/2014 | Lu et al. |
| 2014/0213259 A1 | 7/2014 | Teyeb et al. |
| 2014/0286291 A1 | 9/2014 | Einhaus et al. |
| 2014/0288699 A1 | 9/2014 | Williams et al. |
| 2014/0321313 A1 | 10/2014 | Seo et al. |
| 2014/0355562 A1 | 12/2014 | Gao et al. |
| 2015/0003325 A1 | 1/2015 | Sajadieh et al. |
| 2015/0003326 A1 | 1/2015 | Zaus |
| 2015/0003338 A1 | 1/2015 | Xue et al. |
| 2015/0003543 A1 | 1/2015 | Shirani-Mehr et al. |
| 2015/0004980 A1 | 1/2015 | Vannithamby et al. |
| 2015/0004995 A1 | 1/2015 | Koc et al. |
| 2015/0056993 A1 | 2/2015 | Zhu et al. |
| 2015/0139006 A1 | 5/2015 | Seo et al. |
| 2015/0223197 A1 | 8/2015 | Kim et al. |
| 2015/0282029 A1 | 10/2015 | Faccin et al. |
| 2015/0296354 A1 | 10/2015 | Liao et al. |
| 2015/0304953 A1 | 10/2015 | Sun |
| 2015/0372793 A1 | 12/2015 | Kang et al. |
| 2015/0373736 A1 | 12/2015 | Ji et al. |
| 2016/0100401 A1 | 4/2016 | Xiong et al. |
| 2016/0119967 A1 | 4/2016 | Zaus |
| 2016/0278069 A1 | 9/2016 | Lee et al. |
| 2017/0359823 A1 | 12/2017 | Zaus |

FOREIGN PATENT DOCUMENTS

| | | |
|---|---|---|
| CN | 101394215 A | 3/2009 |
| CN | 101647246 A | 2/2010 |
| CN | 101800582 A | 8/2010 |
| CN | 101807978 A | 8/2010 |
| CN | 101815325 A | 8/2010 |
| CN | 101835159 A | 9/2010 |
| CN | 101944981 A | 1/2011 |
| CN | 102084708 A | 6/2011 |
| CN | 102158964 A | 8/2011 |
| CN | 102217360 A | 10/2011 |
| CN | 102301796 A | 12/2011 |
| CN | 102484885 A | 5/2012 |
| CN | 102781110 A | 11/2012 |
| CN | 102792605 A | 11/2012 |
| CN | 102859925 A | 1/2013 |
| CN | 102883440 A | 1/2013 |
| CN | 102948216 A | 2/2013 |
| CN | 104254067 A | 12/2014 |
| CN | 105229934 A | 1/2016 |
| CN | 105229942 A | 1/2016 |
| CN | 105230053 A | 1/2016 |
| CN | 105247924 A | 1/2016 |
| CN | 105264788 A | 1/2016 |
| CN | 105284059 A | 1/2016 |
| CN | 103004160 A | 3/2017 |
| CN | 104254067 B | 2/2018 |
| EP | 1267443 A2 | 12/2002 |
| EP | 2584804 A1 | 4/2013 |
| EP | 2590336 A1 | 5/2013 |
| EP | 3014787 A1 | 5/2016 |
| EP | 3014788 A1 | 5/2016 |
| EP | 3014790 A1 | 5/2016 |
| EP | 3014909 A1 | 5/2016 |
| EP | 3014923 A1 | 5/2016 |
| EP | 2827649 B1 | 3/2018 |
| HK | 1219355 A1 | 3/2017 |
| HK | 1219356 A1 | 3/2017 |
| HK | 1219380 A1 | 3/2017 |
| JP | 2011259263 A | 12/2012 |
| JP | 2016525305 A | 8/2016 |
| KR | 1020120030548 A | 3/2012 |
| KR | 1020120138791 A | 12/2012 |
| KR | 1020130021569 A | 3/2013 |
| KR | 1020130028106 A | 3/2013 |
| KR | 1020130040749 A | 4/2013 |
| KR | 1020160003021 A | 1/2016 |
| KR | 101855426 B1 | 4/2018 |
| KR | 101857643 B1 | 5/2018 |
| TW | 201316712 A | 4/2013 |
| TW | 201517660 A | 5/2015 |
| TW | 201635825 A | 10/2016 |
| TW | I552624 B | 10/2016 |
| TW | I603643 B | 10/2017 |
| TW | 201811079 A | 3/2018 |
| WO | WO-2010043752 A1 | 4/2010 |
| WO | WO-2010088828 A1 | 8/2010 |
| WO | WO-2010150568 A1 | 12/2010 |
| WO | WO-2011121374 A1 | 10/2011 |
| WO | WO-2011138495 A1 | 11/2011 |
| WO | WO-2012000535 A1 | 1/2012 |
| WO | WO-2012050842 A1 | 4/2012 |
| WO | WO-2012125931 A1 | 9/2012 |
| WO | WO-2013010418 A1 | 1/2013 |
| WO | WO-2013012222 A2 | 1/2013 |
| WO | WO-2013028128 A1 | 2/2013 |
| WO | WO-2013081377 A1 | 6/2013 |
| WO | WO-2014158255 A1 | 10/2014 |
| WO | WO-2014209451 A1 | 12/2014 |
| WO | WO-2014210441 A1 | 12/2014 |
| WO | WO-2014210471 A1 | 12/2014 |
| WO | WO-2014210477 A1 | 12/2014 |
| WO | WO-2014210493 A1 | 12/2014 |
| WO | WO-2014210500 A1 | 12/2014 |

OTHER PUBLICATIONS

"U.S. Appl. No. 14/778,528, Response filed Apr. 16, 2018 to Non Final Office Action dated Jan. 18, 2018", 16 pgs.

"Chinese Application Serial No. 201480029649.4, Resposne filed Mar. 19, 2018 to Office Action dated Nov. 3, 2017", w/ English Claims, 20 pgs.

"Chinese Application Serial No. 201480029685.0, Response filed May 3, 2018 to Office Action dated Dec. 27, 2017", w/ English Claims, 20 pgs.

"Chinese Application Serial No. 201480029688.4, Office Action dated Mar. 28, 2018", w/ Concise Statementof Relevance,13 pgs.

"Chinese Application Serial No. 201480030633.5, Response filed Jun. 1, 2018 to Office Action dated Jan. 19, 2018", w/ English Claims, 20 pgs.

"Chinese Application Serial No. 201480030760.5, Response filed Mar. 30, 2018 to Office Action dated Dec. 27, 2017", w/ English Claims, 18 pgs.

"Chinese Application Serial No. 201480030839.8, Office Action dated Feb. 23, 2018", w/ Concise Statementof Relevance,13 pgs.

"Japanese Application Serial No. 2016-521919, Response filed May 2, 2018to Office Action dated Dec. 5, 2017", w/ English Claims, 10 pgs.

"Taiwanese Application Serial No. 106129816, Office Action dated May 16, 2018",w/ Concise Statement of Relevance, 8 pgs.

"U.S. Appl. No. 14/136,554, Corrected Notice of Allowance dated Aug. 23, 2017", 2 pgs.

"U.S. Appl. No. 14/136,554, Examiner Interview Summary dated Feb. 17, 2017", 2 pgs.

"U.S. Appl. No. 14/136,554, Notice of Allowance dated Jun. 5, 2017", 8 pgs.

"U.S. Appl. No. 14/136,554, Response filed Feb. 28, 2017 to Non Final Office Action dated Dec. 2, 2016", 8 pgs.

"U.S. Appl. No. 14/141,206, Notice of Allowance dated Dec. 12, 2016", 8 pgs.

(56) References Cited

OTHER PUBLICATIONS

"U.S. Appl. No. 14/141,223, Advisory Action dated May 18, 2017", 3 pgs.
"U.S. Appl. No. 14/141,223, Final Office Action dated Jan. 3, 2017", 26 pgs.
"U.S. Appl. No. 14/141,223, Response filed May 3, 2017 to Final Office Action dated Jan. 3, 2017", 10 pgs.
"U.S. Appl. No. 14/778,528, Non Final Office Action dated Jan. 18, 2018", 22 pgs.
"U.S. Appl. No. 14/778,528, Response filed Sep. 28, 2017 to Non Final Office Action dated Jun. 28, 2017", 13 pgs.
"U.S. Appl. No. 14/990,054, Corrected Notice of Allowance dated May 9, 2017", 2 pgs.
"U.S. Appl. No. 14/990,054, Examiner-Initiated Interview Summary dated Mar. 29, 2017", 1 pg.
"U.S. Appl. No. 14/990,054, Notice of Allowance dated Mar. 29, 2017", 12 pgs.
"Chinese Application Serial No. 201410295081.2, Office Action dated Apr. 6, 2017", w/ English Translation, 14 pgs.
"Chinese Application Serial No. 201410295081.2, Response filed Aug. 18, 2017 to Office Action dated Apr. 6, 2017", w/ English Claims, 11 pgs.
"Chinese Application Serial No. 201480029649.4, Office Action dated Nov. 3, 2017", Without English Translation, 11 pgs.
"Chinese Application Serial No. 201480029685.0, Office Action dated Dec. 27, 2017", without English Translation, 11 pgs.
"Chinese Application Serial No. 201480030633.5, Office Action dated Jan. 19, 2018", 18 pgs.
"Chinese Application Serial No. 201480030760.5, Office Action dated Dec. 27, 2017", Without English Translation, 10 pgs.
"European Application Serial No. 14816958.4, Response filed Sep. 4, 2017 to Extended European Search Report dated Feb. 3, 2017", 10 pgs.
"European Application Serial No. 14817851.0, Response filed Oct. 2, 2017 to Extended European Search Report dated Mar. 2, 2017", 13 pgs.
"Japanese Application Serial No. 2016-521919, Office Action dated Jan. 31, 2017", W/ English Translation, 4 pgs.
"Japanese Application Serial No. 2016-521919, Office Action dated Dec. 5, 2017", w/ English Translation, 5 pgs.
"Japanese Application Serial No. 2016-521919, Response filed May 1, 2017 to Office Action dated Jan. 31, 2017", w/ English Claims, 18 pgs.
"Korean Application Serial No. 10-2015-7033288, Office Action dated Dec. 1, 2016", w/ English Translation, 10 pgs.
"Korean Application Serial No. 10-2015-7033288, Response filed Aug. 31, 2017 to Office Action dated Jun. 30, 2017", w/ English Claims, 16 pgs.
"Korean Application Serial No. 10-2015-7033288, Response filed Feb. 1, 2017 to Office Action dated Dec. 1, 2016", w/ English Claims, 14 pgs.
"Korean Application Serial No. 2015-7033741, Office Action dated Mar. 18, 2017", With English Translation, 9 pgs.
"Korean Application Serial No. 2015-7033741, Office Action dated Oct. 31, 2017", With English Translation, 5 pgs.
"Korean Application Serial No. 2015-7033741, Response filed May 18, 2017 to Office Action dated Mar. 18, 2017", w/ English Claims, 26 pgs.
"Reply LS on UE's inconsistent behaviour when PS Back-off timer is running", 3GPP TSG-CT WG1?83 C1-131808, [Online] retrieved from the internet: <http://www.3gpp.org/ftp/tsg_ct/WG1_mm-cc-sm_ex-CN1/TSGC1_83_Chengdu/docs/C1-131808.zip>, (May 2, 2013), 1 pg.
"Taiwanese Application Serial No. 105119738, Office Action dated Jan. 24, 2017", (English Translation), 23 pgs.
"Taiwanese Application Serial No. 105119738, Response filed May 1, 2017 to Office Action dated Jan. 24, 2017", w/o English Translation, 10 pgs.
U.S. Appl. No. 14/141,067, U.S. Pat. No. 9,320,063, filed Dec. 26, 2013, Resuming Packet Services in a Mobile Network.
U.S. Appl. No. 14/990,054, U.S. Pat. No. 9,750,017, filed Jan. 7, 2016, Resuming Packet Services in a Mobile Network.
U.S. Appl. No. 15/688,159, filed Aug. 28, 2017, Resuming Packet Services in a Mobile Network.
U.S. Appl. No. 14/109,211, U.S. Pat No. 9,814,037, filed Dec. 17, 2013, Method for Efficient Channel Estimation and Beamforming in FDD System by Exploiting Uplink-Downlink Correspondence.
U.S. Appl. No. 14/141,206, U.S. Pat. No. 9,655,107, filed Dec. 26, 2013, Subspace Tracking in Full Dimension MIMO.
U.S. Appl. No. 15/495,260, filed Apr. 24, 2017, Subspace Tracking in Full Dimension MIMO.
U.S. Appl. No. 14/141,223, filed Dec. 26, 2013, Aligning Radio Resource Control Parameters in Small Cell Deployments.
U.S. Appl. No. 14/133,215, filed Dec. 18, 2013, Progressive Channel State Information.
U.S. Appl. No. 14/136,554, U.S. Pat. No. 9,794,870, filed Dec. 20, 2013, User Equipment and Method for User Equipment Feedback of Flow-to-Rat Mapping Preferences.
U.S. Appl. No. 14/788,528, filed Sep. 18, 2015, User Equipment and Method for Resource Allocation and Device-to-Device Discovery Hopping.
"3GPP TS Group Services and System Aspects(Release 8)", 3GPP TS 23.401, V8.16.0, (Mar. 2012), 238 pages.
"3rd Generation Partnership Project; Technical Specification Group Radio Access Network; Evolved Universal Terrestrial Radio Access (EUTRA); Study on Small Cell Enhancements for E-UTRA and E-UTRAN—Higher layer aspects (Release)", 3GPP Standard; 3GPP TR 36.842, 3RD Generation Partnership Project (3GPP), vol. Ran WG2, No. V0.2.0, (May 2013), 38 pgs.
"U.S. Appl. No. 14/109,211, Advisory Action dated Aug. 22, 2016", 5 pgs.
"U.S. Appl. No. 14/109,211, Corrected Notice of Allowance dated Sep. 7, 2017", 2 pgs.
"U.S. Appl. No. 14/109,211, Examiner Interview Summary dated Feb. 23, 2017", 1 pg.
"U.S. Appl. No. 14/109,211, Final Office Action dated Feb. 23, 2017", 21 pgs.
"U.S. Appl. No. 14/109,211, Final Office Action dated Jun. 10, 2016", 17 pgs.
"U.S. Appl. No. 14/109,211, Non Final Office Action dated Sep. 28, 2016", 18 pgs.
"U.S. Appl. No. 14/109,211, Non Final Office Action dated Dec. 14, 2015", 15 pgs.
"U.S. Appl. No. 14/109,211, Notice of Allowability dated Jun. 23, 2017", 2 pgs.
"U.S. Appl. No. 14/109,211, Notice of Allowance dated May 30, 2017", 15 pgs.
"U.S. Appl. No. 14/109,211, Response filed Apr. 21, 2017 to Final Office Action dated Feb. 23, 2017", 14 pgs.
"U.S. Appl. No. 14/109,211, Response filed Aug. 5, 2016 to Final Office Action dated Jun. 10, 2016", 9 pgs.
"U.S. Appl. No. 14/109,211, Response filed Sep. 12, 2016 to Advisory Action dated Aug. 22, 2016", 9 pgs.
"U.S. Appl. No. 14/109,211, Response filed Dec. 9, 2016 to Non-Final Office Action dated Sep. 28, 2016", 16 pgs.
"U.S. Appl. No. 14/109,211,Response filed Mar. 14, 2016 to Non Final Office Action dated Dec. 14, 2015", 21 pgs.
"U.S. Appl. No. 14/133,215, Advisory Action dated Aug. 4, 2016", 3 pgs.
"U.S. Appl. No. 14/133,215, Examiner Interview Summary dated Mar. 2, 2016", 3 pgs.
"U.S. Appl. No. 14/133,215, Examiner Interview Summary dated May 26, 2016", 2 pgs.
"U.S. Appl. No. 14/133,215, Examiner Interview Summary dated Jul. 12, 2016", 3 pgs.
"U.S. Appl. No. 14/133,215, Final Office Action dated Jun. 3, 2016", 15 pgs.
"U.S. Appl. No. 14/133,215, Non Final Office Action dated Feb. 2, 2016", 25 pgs.
"U.S. Appl. No. 14/133,215, Non Final Office Action dated Oct. 8, 2015", 15 pgs.
"U.S. Appl. No. 14/133,215, Preliminary Amendment filed Nov. 22, 2013", 10 pgs.

(56) References Cited

OTHER PUBLICATIONS

"U.S. Appl. No. 14/133,215, Response filed Mar. 7, 2016 to Non Final Office Action dated Feb. 2, 2016", 12 pgs.
"U.S. Appl. No. 14/133,215, Response Filed Jul. 7, 2016 to Final Office Action dated Jun. 3, 2016", 10 pgs.
"U.S. Appl. No. 14/136,554, Advisory Action dated Dec. 8, 2015", 3 pgs.
"U.S. Appl. No. 14/136,554, Examiner Interview Summary dated Dec. 1, 2015", 3 pgs.
"U.S. Appl. No. 14/136,554, Final Office Action dated Sep. 21, 2015", 12 pgs.
"U.S. Appl. No. 14/136,554, Non Final Office Action dated Mar. 17, 2015", 11 pgs.
"U.S. Appl. No. 14/136,554, Non Final Office Action dated Dec. 2, 2016", 11 pgs.
"U.S. Appl. No. 14/136,554, Response filed Jun. 17, 2015 to Non Final Office Action dated Mar. 17, 2015", 6 pgs.
"U.S. Appl. No. 14/136,554, Response filed Nov. 24, 2015 to Final Office Action dated Sep. 21, 2015", 6 pgs.
"U.S. Appl. No. 14/141,067, Non Final Office Action dated Jul. 8, 2015", 9 pgs.
"U.S. Appl. No. 14/141,067, Notice of Allowance dated Dec. 10, 2015", 9 pgs.
"U.S. Appl. No. 14/141,067,Response filed Oct. 8, 2015 Non Final Office Action dated Jul. 8, 2015", 9 pgs.
"U.S. Appl. No. 14/141,206, Advisory Action dated Aug. 19, 2015", 4 pgs.
"U.S. Appl. No. 14/141,206, Applicant's Summary of Examiner Interview filed Sep. 15, 2015", 1 pg.
"U.S. Appl. No. 14/141,206, Examiner Interview Summary dated Jan. 25, 2016", 3 pgs.
"U.S. Appl. No. 14/141,206, Examiner Interview Summary dated Aug. 26, 2015", 3 pgs.
"U.S. Appl. No. 14/141,206, Final Office Action dated May 15, 2015", 13 pgs.
"U.S. Appl. No. 14/141,206, Final Office Action dated Aug. 24, 2016", 9 pgs.
"U.S. Appl. No. 14/141,206, Non Final Office Action dated Jan. 7, 2016", 12 pgs.
"U.S. Appl. No. 14/141,206, Non Final Office Action dated Dec. 3, 2014", 13 pgs.
"U.S. Appl. No. 14/141,206, Response filed Apr. 2, 2015 to Non Final Office Action dated Dec. 3, 2014", 12 pgs.
"U.S. Appl. No. 14/141,206, Response filed May 6, 2016 to Non Final Office Action dated Jan. 7, 2016", 11 pgs.
"U.S. Appl. No. 14/141,206, Response filed Aug. 11, 2015 to Final Office Action dated May 15, 2015", 12 pgs.
"U.S. Appl. No. 14/141,206, Response filed Nov. 23, 2016 to Final Office Action dated Aug. 24, 2016", 9 pgs.
"U.S. Appl. No. 14/141,223, Advisory Action dated Dec. 11, 2015", 4 pgs.
"U.S. Appl. No. 14/141,223, Examiner Interview Summary dated Dec. 2, 2015", 3 pgs.
"U.S. Appl. No. 14/141,223, Final Office Action dated Oct. 7, 2015", 19 pgs.
"U.S. Appl. No. 14/141,223, Non Final Office Action dated Apr. 14, 2015", 18 pgs.
"U.S. Appl. No. 14/141,223, Non Final Office Action dated Jul. 28, 2016", 18 pgs.
"U.S. Appl. No. 14/141,223, Response filed Aug. 12, 2015 to Non Final Office Action dated Apr. 14, 2015", 11 pgs.
"U.S. Appl. No. 14/141,223, Response filed Oct. 28, 2016 to Non Final Office Action dated Jul. 28, 2016", 8 pgs.
"U.S. Appl. No. 14/141,223, Response filed Dec. 2, 2015 to Final Office Action dated Oct. 7, 2015", 8 pgs.
"U.S. Appl. No. 14/778,528, Non Final Office Action dated Jun. 28, 2017", 22 pgs.
"U.S. Appl. No. 14/990,054, Corrected Notice of Allowance dated Jul. 27, 2017", 2 pgs.

"U.S. Appl. No. 14/990,054, Preliminary Amendment filed Jan. 11, 2016", 7 pgs.
"Circuit Switched (CS) fallback in Evolved Packet System (EPS); Stage 2", 3GPP TS 23.272 V11.5.0. Technical Specification Group Services and System Aspects. Release 11., (Jun. 2013), 95 pgs.
"Clarification on the scope of ISRP Filter Rule priority", LG Electronics, S2-115168, 3GPP TSG-SA2 Meeting #88, (Nov. 2011), 1-4.
"Correction of ISR description for CSFB with suspended PS bearers", 3GPP Draft; S2-104673 23401 R10 ISR IN CSFB V3. 3RD Generation Partnership Project (3GPP). Mobile Competence Centre; 650. Route Des Lucioles ; F-06921 Sophia-Antipolis Cedex ; France, vol. SA WG2. No. Prague, (Oct. 2010), 4 pgs.
"Correlation based explicit feedback", Alcatel-Lucent Shanghai Bell et al: 3GPP Draft; RI-100719, 3RD Generation Partnership Project (3GPP), Mobile Competence Centre ; 650, Route Deslucioles ; F-06921 Sophia-Antipolis Cedex ; France, (Jan. 13, 2010), 12 pgs.
"Discussion on dual RRC", 3GPP Draft; R2-131830 Dual RRC, 3rd Generation Partnership Project (3GPP), Mobile Competence Centre, (May 10, 2013), 2 pgs.
"European Application Serial No. 14171648.0, Extended European Search Report dated Dec. 22, 2014", 7 pgs.
"European Application Serial No. 14171648.0, Response filed Jul. 17, 2015 Extended European Search Report dated Dec. 22, 2014", 8 pgs.
"European Application Serial No. 14816958.4, Extended European Search Report dated Feb. 3, 2017", 11 pgs.
"European Application Serial No. 14817060.8, Extended European Search Report dated Mar. 13, 2017", 12 pgs.
"European Application Serial No. 14817214.1, Extended European Search Report dated Dec. 23, 2016", 9 pgs.
"European Application Serial No. 14817214.1, Response filed Jul. 4, 2017 to Extended European Search Report dated Dec. 23, 2016", 15 pgs.
"European Application Serial No. 14817448.5, Extended European Search Report dated Jun. 9, 2017", 16 pgs.
"European Application Serial No. 14817448.5, Partial Supplementary European Search Report dated Feb. 16, 2017", 11 pgs.
"European Application Serial No. 14817851.0, Extended European Search Report dated Mar. 2, 2017", 11 pgs.
"European Application Serial No. 14818323.9, Extended European Search Report dated Feb. 23, 2017", 10 pgs.
"Evaluation of enhanced MIMO feedbacks for LTE-A", Intel Corporation (UK) LTD: 3GPP Draft; R1-101808_Feedback, 3RD Generation Partnership Project (3GPP), Mobile Competence Centre ; 650, Route Des Lucioles ; F-06921 Sophia-Antipolis Cedex ; France, (Apr. 6, 2010), 1-3,5.
"Evaluation results for feedback enhancement (Scenario A and C)", LG Electronics: 3GPP Draft; RI-114351 LG Evaluation Results SCNAC, 3RD Generation Partnership Project (3GPP), Mobile Competence Centre ; 650, Route Des Lucioles ; F-06921 Sophia-Antipolis Cedex ; France, vol. RAN WG1, No. San Francisco, USA, (Nov. 21, 2011), 8 pgs.
"Evolved Universal Terrestrial Radio Access (E-UTRA); Multiplexing and channel coding", 3GPP TS 36.212 V12.0.0. Technical Specification Group Radio Access Network. Release 12., (Dec. 2013), 88 pgs.
"Evolved Universal Terrestrial Radio Access (E-UTRA); Multiplexing and channel coding", ETSI TS 136 212 V11.3.0 (3GPP TS 36.212 version 11.3.0 Release 11). LTE., (Jul. 2013), 86 pgs.
"Evolved Universal Terrestrial Radio Access (E-UTRA); Physical channels and modulation", 3GPP TS 36.211 V12.0.0. Technical Specification Group Radio Access Network. Release 12., (Dec. 2013), 120 pgs.
"Evolved Universal Terrestrial Radio Access (E-UTRA); Physical channels and modulation", ETSI TS 136 211 v11.3.0 (3GPP TS 36.211 version 11.3.0 Release 11). LTE, (Jul. 2013), 110 pgs.
"Evolved Universal Terrestrial Radio Access (E-UTRA); Physical layer procedures", 3GPP TS 36.213 V12.0.0. Technical Specification Group Radio Access Network. Release 12., (Dec. 2013), 186 pgs.

(56) References Cited

OTHER PUBLICATIONS

"Evolved Universal Terrestrial Radio Access (E-UTRA); Physical layer procedures", ETSI TS 136 213 V11.3.0 (3GPP TS 36.213 version 11.3.0 Release 11). LTE., (Jul. 2013), 178 pgs.

"Evolved Universal Terrestrial Radio Access (E-UTRA); Study on Small Cell Enhancements for E-UTRA and E-UTRAN—Higher layer aspects", 3GPP TR 36.842 V1.0.0. Technical Specification Group Radio Access Network. Release 12., 69 pgs.

"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 28-32.

"General Packet Radio Service (GPRS); Service description; Stage 2", 3GPP TS 23.060 V12.1.0. Technical Specification Group Services and System Aspects. Release 12., (Jun. 2013), 338 pgs.

"Generalized Transformation for adaptive codebooks", Samsung: 3GPP Draft; RI-102204 Adaptive Codebook REV1, 3RD Generation Partnership Project I3GPP), Mobile Competence Centre 650, Route Deslucioles ; F-06921 Sophia-Antipolis Cedex ; France, vol. RAN WG1, No. Beijing , China;, (Apr. 6, 2010), 10 pgs.

"IEEE Standard for Air Interface for Broadband Wireless Access Systems", IEEE Std 802.16. IEEE Computer Society. IEEE Microwave Theory and Techniques Society., (Aug. 17, 2012), 2544 pgs.

"IEEE Standard for Air Interface for Broadband Wireless Access Systems: Amendment 1: Enhancements to Support Machine-to-Machine Applications", IEEE Std 802.16p-2012. IEEE Computer Society. IEEE Microwave Theory and Techniques Society., (Oct. 8, 2012), 82 pgs.

"Impact of small cell enhancements to RRC functions", 3GPP TSG-RAN WG2 Meeting #82, R2-131672, (May 24, 2013), 6 pgs.

"International Application Serial No. PCT/US2014/031996, International Preliminary Report on Patentability dated Jan. 7, 2016", 6 pgs.

"International Application Serial No. PCT/US2014/031996, International Search Report dated Aug. 26, 2014", 3 pgs.

"International Application Serial No. PCT/US2014/031996, Written Opinion dated Aug. 26, 2014", 4 pgs.

"International Application Serial No. PCT/US2014/044540, International Preliminary Report on Patentability dated Jan. 7, 2016", 8 pgs.

"International Application Serial No. PCT/US2014/044540, International Search Report dated Oct. 15, 2014", 3 pgs.

"International Application Serial No. PCT/US2014/044540, Written Opinion dated Oct. 15, 2014", 6 pgs.

"International Application Serial No. PCT/US2014/044592, International Preliminary Report on Patentability dated Jan. 7, 2016", 7 pgs.

"International Application Serial No. PCT/US2014/044592, International Search Report dated Sep. 24, 2014", 3 pgs.

"International Application Serial No. PCT/US2014/044592, Written Opinion dated Sep. 29, 2014", 5 pgs.

"International Application Serial No. PCT/US2014/044606, International Preliminary Report on Patentability dated Jan. 7, 2016", 16 pgs.

"International Application Serial No. PCT/US2014/044606, International Search Report dated Oct. 22, 2014", 3 pgs.

"International Application Serial No. PCT/US2014/044606, Written Opinion dated Oct. 22, 2014", 6 pgs.

"International Application Serial No. PCT/US2014/044626, International Preliminary Report on Patentability dated Jan. 7, 2016", 7 pgs.

"International Application Serial No. PCT/US2014/044626, International Search Report dated Oct. 22, 2014", 3 pgs.

"International Application Serial No. PCT/US2014/044626, Written Opinion dated Oct. 22, 2014", 5 pgs.

"International Application Serial No. PCT/US2014/044640, International Preliminary Report on Patentability dated Jan. 7, 2016", 8 pgs.

"International Application Serial No. PCT/US2014/044640, International Search Report dated Oct. 21, 2014", 4 pgs.

"International Application Serial No. PCT/US2014/044640, Written Opinion dated Oct. 21, 2014", 6 pgs.

"Korean Application Serial No. 10-2015-7033288, Office Action dated Jun. 20, 2017", w/ English Translation, 19 pgs.

"Mobile radio interface Layer 3 specification; Core network protocols; Stage 3", 3GPP TS 24.008 V12.2.0. Technical Specification Group Core Network and Terminals. Release 12., (Jun. 2013), 682 pgs.

"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.

"On the remaining aspects of PMI and RI reporting accuracy tests fo r eDL-MIMO", QUALCOMM Incorporated: 3GPP Draft; R4-114211, 3RD Generation Partnership Project (3GPP), Mobile Competence Centre ; 650, Route Deslucioles ; F-06921 Sophia-Antipolis Cedex ; France, vol. RAN WG4, No. Athens, Greece, (Aug. 17, 2011), 4 pgs.

"Part 11: Wireless LAN Medium Access Control (MAC) and Physical Layer (PHY) Specifications: Amendment 3: Enhancements for Very High Throughput in the 60 GHz Band", IEEE Std 802. 11ad. (Amendment to IEEE Std 802.11 ™-2012, as amended by IEEE Std 802.11ae™-2012 and IEEE Std 802.11aa™-2012), (Dec. 28, 2012), 628 pgs.

"RA update after Cell Change Order (CCO) to GERAN", 3GPP Draft; S2-123292 WASS2-122780 RA Update After Cell Change Order (CCO) to GERAN. 3RD Generation Partnership Project (3GPP). Mobile Competence Centre; 650. Route Des Lucioles ; F-06921 Sophia-Anti, vol. SA WG2. No. Barcelona. Spain, Retrieved from the Internet: <URL:http://www.3gpp.org/ftpjtsg sajWG2 Arch/ TSGS2 92 Barcelona/Docs/> [retrieved-on Jul. 12, 2012], (Jul. 2012), 3 pgs.

"SU/MU MIMO Feedback with Codebook-based Vector Quantization", Samsung: 3GPP Draft; RI-094322 SUMU MIMO Feedback With Codebook-Based Vector Quantization, 3RD Generation Partnership Project (3GPP), Mobile Competence Centre ; 650, Route Des Lucioles ; F-06921 Sophia-Antipolis Cedex ; France, (Oct. 7, 2009), 9 pgs.

"Taiwanese Application Serial No. 103120032, Office Action dated Sep. 23, 2015", W/ English Translation, 14 pgs.

"Taiwanese Application Serial No. 103120032, Response filed Dec. 16, 2015 to Office Action dated Sep. 23, 2015", W/ English Claims, 17 pgs.

"Taiwanese Application Serial No. 103121919, Office Action dated Dec. 17, 2015", W/ English Search Report, 10 pgs.

"Taiwanese Application Serial No. 103121919, Response filed Jun. 20, 2016 to Office Action dated Dec. 17, 2015", W/ English Translation of Claims, 64 pgs.

"Techniques for D2D Discovery", R1-132503, 3GPP TSG RAN WG1 Meeting #73, (May 2013), 1-7.

Alcatel-Lucent, et al., "Grid of beams for MU-MIMO", 3GPP Draft; RI-100421 GOB, 3RD Generation Partnership Project (3GPP), Mobile Competence Centre ; 650, Route Deslucioles ; F-06921 Sophia-Antipolis Cedex; France, vol. RAN WG1, No. Valencia, Spain, (Jan. 12, 2010), 6 pgs.

Alcatel-Lucent, Shanghai Bell, et al., "Considerations on CSI feedback enhancements fo r high-priority antenna configurations", 3GPP Draft; RI-112420 Considerations on CSI Feedback Enhancements for High-Priority Antenna Configurat10ns_Clean, 3RD Generation Partnership Project (3GPP), Mobile Competence Centre ; 650, Route Deslucioles, (Aug. 18, 2011), 7 pgs.

Delmas, Jean P, "Chapter 4: Subspace Tracking for Signal Processing", Adaptive Signal Processing: Next Generation Solutions, John Wiley & Sons, Inc., (Jun. 16, 2010), 211-270.

NTT Docomo, "Initial Views on Unified Approach for D2D Discovery", 3GPP Draft; R1-132371 D2D Discovery Unified. 3RD Generation Partnership Project (3GPP), Retrieved from the Internet: <URL:http://www.3gpp.org/ftpjtsg ran/WG1 RL1/TSGR173/ Docs/>, (May 11, 2013), 7 pgs.

Shirani-Mehr, Hooman, et al., "Practical Downlink Transmission Schemes for Future LTE Systems with Many Base-Station Antennas", IEEE Globecom, (2013), 5 pgs.

(56) References Cited

OTHER PUBLICATIONS

Yang, Bang, "Projection approximation subspace tracking", IEEE Transactions on Signal Processing, 43(1), (Jan. 1995), 95-107.

* cited by examiner

METHOD FOR EFFICIENT CHANNEL ESTIMATION AND BEAMFORMING IN FDD SYSTEM BY EXPLOITING UPLINK-DOWNLINK CORRESPONDENCE

PRIORITY APPLICATION

This application is a continuation of U.S. patent application Ser. No. 14/109,211, filed on Dec. 17, 2013, now issued as U.S. Pat. No. 9,814,037, which claims the benefit of priority to U.S. Provisional Patent Application Ser. No. 61/841,230, filed Jun. 28, 2013, each of which are incorporated herein by reference in their entirety.

TECHNICAL FIELD

Embodiments pertain to operations and communications performed by electronic devices in wireless networks. Some embodiments relate to for selecting at least one parameter for downlink data transmission with a mobile user equipment.

BACKGROUND

A typical wireless communication base station, such as a cellular system, can include multiple antennas. The multiple antennas can increase sensitivity to received signals along a desired direction, while decreasing sensitivity away from the desired direction. In addition, the multiple antennas can direct a transmitted signal along a desired direction. Both of these directional effects are desirable for users having user equipment, such as cellular telephones. For instance, the directionality in sending and receiving signals can improve reception for a cellular telephone user, and can reduce instances of dropped calls.

In general, it is computationally intensive to monitor a direction from a base station to a user, and to provide signals to and from the multiple antennas to take advantage of the directional effects. Accordingly, there exists a need for reducing the computational complexity of the directional effects from a multiple-antenna communication system.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In a wireless communication system, a user with user equipment communicates wirelessly with a base station. For example, in a cellular telephone system, a cellular telephone user sends wireless signals to a base station, and receives wireless signals from the base station. The transmitted and received signals often traverse more than one physical path from the UE to the base station. For instance, one path may be directly between the UE and the base station, while another may include a bounce off a building.

Figure 1:
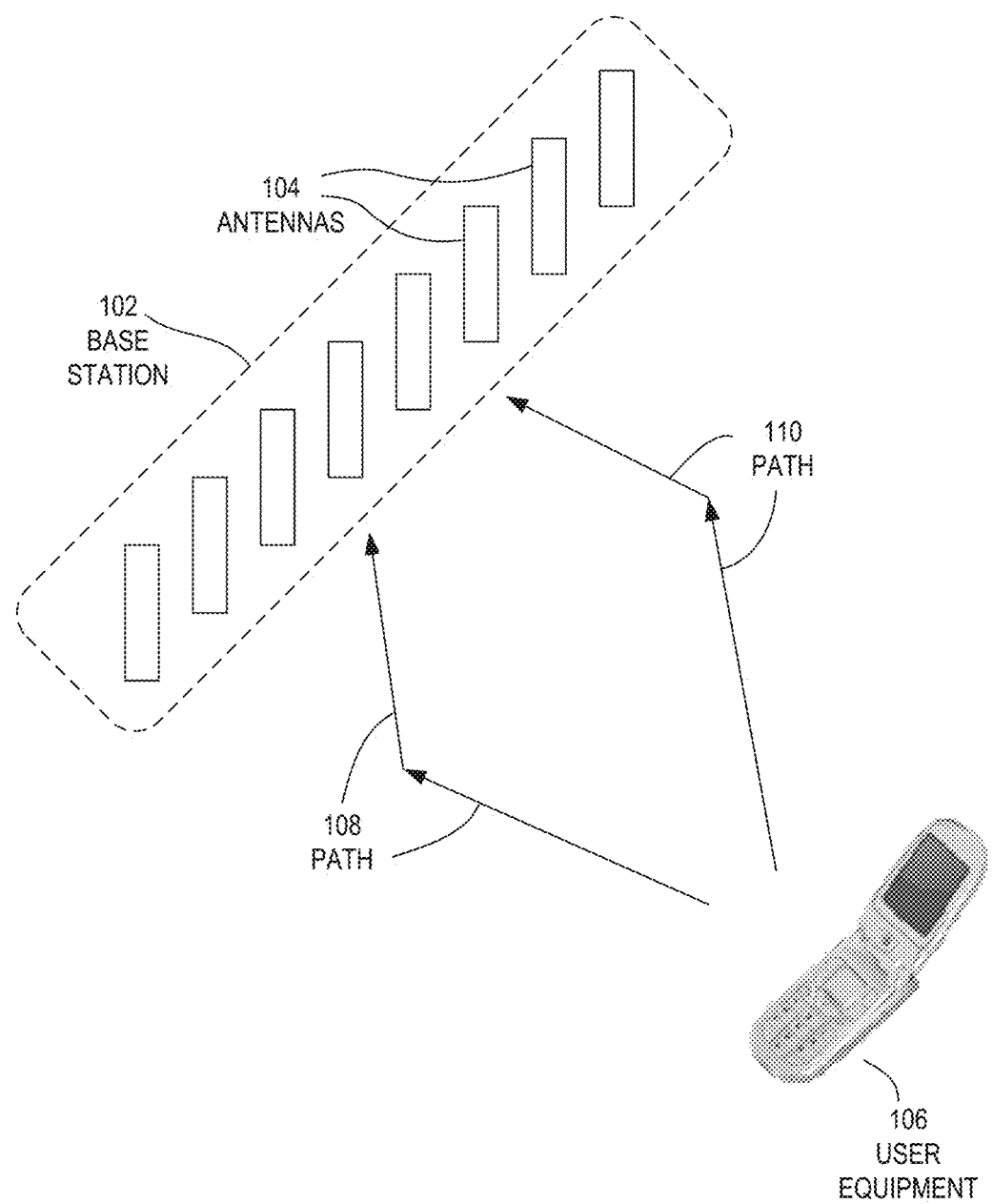
FIG. 1 illustrates an example of a base station having multiple antennas, a user having a user equipment, and multiple paths along which signals travel.

FIG. 1 illustrates an example of a base station (BS) 102 having multiple antennas 104, a user having a user equipment (UE) 106, and multiple paths 108, 110 between the base station 102 and the UE 106 along which signals travel. Each path 108, 110 has its own phase, its own power, its own angle-of-arrival (AoA) at the base station 102, and its own angle-of-departure (AoD) from the base station 102. The paths 108, 110 can change dynamically as the user moves. In some examples, the base station (BS) includes a relatively large number of antennas, such as 4, 8, 16, 32, and so forth. As the number of antennas increases, the precision of the signal directionality increases, and the computation complexity required to maintain that precision also increases. In some examples, the antennas 104 at the base station 102 are uniformly separated along one dimension. In some examples, for systems that use frequency-division duplexing (FDD) for uplink (UL) and downlink (DL) signals, the UL phase and DL phase on each path or subpath are independent of each other.

Figure 2:
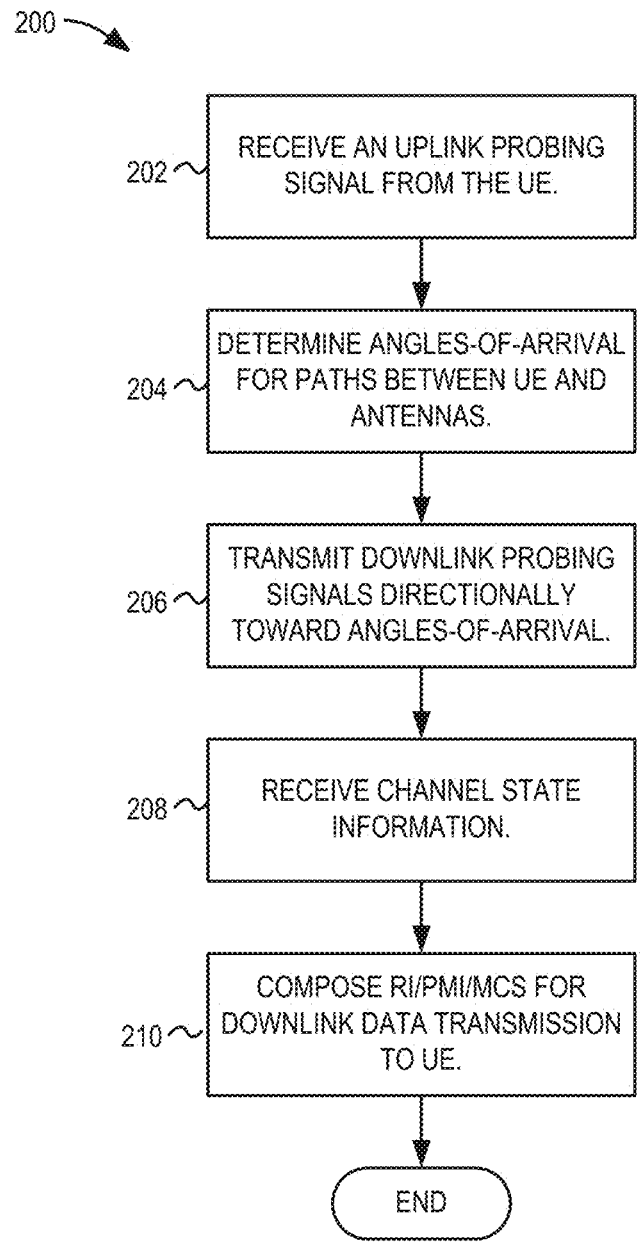
FIG. 2 illustrates a flow chart of an example of a method for selecting at least one parameter for downlink data transmission with the mobile user equipment.

FIG. 2 illustrates a flow chart of an example of a method 200 for selecting at least one parameter for downlink data transmission with the mobile user equipment. The method can be executed by a wireless communication base station, such as base station 102, having multiple antennas, such as antennas 104, configured to communicate wirelessly with mobile user equipment, such as user equipment 106.

At 202, method 200 receives an uplink probing signal from the mobile user equipment. At 204, method 200 determines, from the received uplink probing signal, a plurality of angles-of-arrival for a corresponding plurality of paths between the mobile user equipment and the multiple antennas. At 206, method 200 transmits, from the multiple antennas, a plurality of downlink probing signals directionally toward corresponding angles-of-arrival in the plurality of angles-of-arrival. Each downlink probing signal can be a virtual antenna port with respect to the mobile user equipment. At 208, method 200 receives, from the mobile user equipment, channel state information. At 210, method 200 composes, in response to the received channel state information, at least one of a rank indicator (RI), preceding matrix indicator (PMI), or modulating and coding scheme (MCS) for downlink data transmission to the mobile user equipment. Method 200 is but one example of a method for selecting at least one parameter for downlink data transmission with the mobile user equipment; other methods may also be used.

There are three basic aspects to the method 200. In a first aspect, mobile user equipment (UE) sends an uplink probing/sounding signal. The base station (BS) then determines or estimates angles-of-arrivals (AoAs) of several significant paths. A frequency translation method is also provided. In a second aspect, the BS sends out probing signals towards the selected AoAs, each as a different antenna port towards the UE. The probing signal is a virtual antenna port, such as DFT beamform vector. Depending on how many such AoAs are selected, different numbers of antenna ports can be allocated to the UE. The UE does channel estimation and feeds back the channel state information or beam selection information to the BS. In a third aspect, the BS composes the best rank indicator (RI), precoding matrix indicator (PMI), and/or modulating and coding scheme (MCS) for downlink (DL) data transmission. Each of these aspects is discussed below in greater detail.

There are numerous potential advantages to using the method described herein. For instance, in contrast with a scheme in which the angles-of-arrival are not initially determined or estimated, where a relatively large search space is randomly probed, the method discussed herein in which the angles-of-arrival are determined from an uplink probing signal is much more efficient. Another potential advantage is the new channel state feedback. In the present design, the DL antenna ports are formed by DFT vectors as a virtual antenna port. This can be considered as being a subset of current LTE code book, especially case of 8-tx antenna. In the present design, the UL channel feedback can be simplified to focus on rank determination and beam selection, which can reduce or simplify calculations. Furthermore, a frequency translation algorithm suitable for dealing with different angles is provided.

The first aspect involves UL channel sounding for AoA estimation, the UE is scheduled by the BS (eNB) to send out sounding signals from one of its antennas. Upon receiving signals on the UL at the BS, the UE and/or the BS estimates the AoAs of the signals.

An example of an AoA estimation algorithm follows. By ULA assumption, if there are N paths, the received signal in frequency domain will be the following format:

$$A := A_1 \beta_1 + \ldots + A_N \beta_N \quad (1)$$

where $$\beta_n = \begin{bmatrix} 1 \\ e^{-j2\pi\Delta\frac{f_{UL}}{F_0}\cos(\alpha_n)} \\ \vdots \\ e^{-j2\pi\Delta\frac{f_{UL}}{F_0}(M-1)\cos(\alpha_n)} \end{bmatrix} \quad (2)$$

is the spatial signature of the n-th path, $f_{UL}$ is the uplink frequency, $F_0$ is the carrier frequency, and $\Delta$ is the antenna distance in terms of wavelength at $F_0$. The received signal has the mathematical form of several DFT vectors.

By projecting the received signal towards different spatial signatures spanning the angular space, one can find the major power peaks along the directions. The projection, $$[1, e^{j2\pi\Delta_{UL}\cos\theta}, \ldots, e^{j2\pi(M-1)\Delta_{UL}\cos\theta}]$$

is considered for:

$\theta \in [0, \pi)$, where $\Delta_{UL}$ is the antenna spacing in terms of UL wave length. Peak values of this function over [0, pi) yields the estimated AoAs of the major paths. This set of estimated AoAs is written as:

$$A_{est} := \{A_1, A_2, \ldots, A_N\} \quad (3)$$

This is but one example of a suitable AoA estimation algorithm; other suitable algorithms can also be used.

The first aspect also involves Per-Path frequency translation.

The uplink probing signal and the downlink probing signals can be at different frequencies. Determining the downlink probing signal, in response to the uplink probing signal, can involve determining an uplink channel vector, multiplying the uplink channel vector by a diagonal matrix to form a product, and adopting the product to be the downlink channel vector. In some examples, the diagonal matrix includes, at the Mth row and column, a complex exponential factor having an exponent that varies as (M−1) multiplied by the difference in frequency between the uplink probing signal and the downlink probing signal.

For a particular path, the UL channel and DL channel (DFT) vectors can be $$\beta_{n,UL} = \begin{bmatrix} 1 \\ e^{-j2\pi\Delta\frac{f_{UL}}{F_0}\cos(\alpha_n)} \\ \vdots \\ e^{-j2\pi\Delta\frac{f_{UL}}{F_0}(M-1)\cos(\alpha_n)} \end{bmatrix}$$

and $$\beta_{n,DL} = \begin{bmatrix} 1 \\ e^{-j2\pi\Delta\frac{f_{DL}}{F_0}\cos(\alpha_n)} \\ \vdots \\ e^{-j2\pi\Delta\frac{f_{DL}}{F_0}(M-1)\cos(\alpha_n)} \end{bmatrix},$$

respectively. From the UL channel sounding/estimation process, the UL vector $\beta_{n,UL}$ is determined. To get the DL vector, the following translation is applied:

$$\hat{\beta}_{n,DL} = \text{diag}\left\{1, e^{-j2\pi\Delta\frac{f_{DL}-f_{UL}}{F_0}\cos(\alpha_n)}, \ldots, e^{-j2\pi\Delta\frac{f_{DL}-f_{UL}}{F_0}(M-1)\cos(\alpha_n)}\right\}\beta_{n,UL}$$

This translation process is applied for each significant direction, as it is identified. In the next step this estimated DFT vector is used for DL beamforming. A further step to help is to let UE switch its transmit antennas in uplink sounding.

The first aspect also involves UE antenna switching in UL sounding for multi-rank DL transmission.

UE will switch its transmit antennas in a pre-determined manner in the UL sounding process for eNB to detect multi-rank transmission opportunities. This allows the eNB to determine if it can discriminate the antennas for supporting DL multi-stream transmission. In general, the AoA/AoD resolution increases with the number of antennas. Given a reasonable number of antennas, such as 8×8 or 16×1, and possibly different antenna spacing, more accurate information on beam directions and phase/power information can be obtained by DL proactive probing in the second aspect.

The second aspect involves DL probing with precoded beams towards significant UL AoAs. In some examples, the virtual antenna ports are specifically designed based on $A_{est}$ from equation (3). The eNB tells the UE that N1 ports are supported in the transmission. Here N1 can take on the value of 1, 2, 4, or 8. One can choose N1 elements $A_{N1}$ from $A_{est}$ to cover the significant directions in $A_{est}$. Then, the eNB translates the DFT vectors in $A_{N1}$ according to the translation equation above. Now it uses the complex transposes of them as defining (pre-coding) vector for the DL virtual CSI-RS ports. (as in Step 2.1.2 later). Note that the method works, regardless of the size of the UL/DL frequency gap, due to the per-path translation and DL CSI-RS probing.

The second aspect also involves RS transmission on top of the chosen $A_{N1}$. The eNB applies CSI-RS signals on top of the N1 virtual ports. The resources on which the ports are transmitted are pre-determined and thus are known to the UE.

The second aspect also involves UE feedback design. The UE can measure and feedback channel state information or other measures. There are several options: As a first option, when N1 is small, e.g., less than 4, the UE uses the equations (1) and (2) above, and an older codebook for RI/CQI/PMI feedback. As a second option, when N1 is large, e.g., larger than 4, the UE first down-selects the ports into less than 4 based on CSI-RS measurement and throughput considerations, then calculates the best RI/CQI/PMI based on the selected beams. As a third option, the BS can provide explicit phase/power feedback for each port.

The third aspect involves DL data transmission. At this stage, the eNB has calculated a small set of DFT vectors suitable for data transmission towards the UE. Also, the eNB knows how to combine them with the number of data layers that are used. The eNB can use this information for data transmission, e.g., on the PDSCH channel.

Although the preceding examples of wireless network connections were provided with specific reference to 3GPP LTE/LTE-A, IEEE 802.11, and Bluetooth communication standards, it will be understood that a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 4.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

Figure 3:
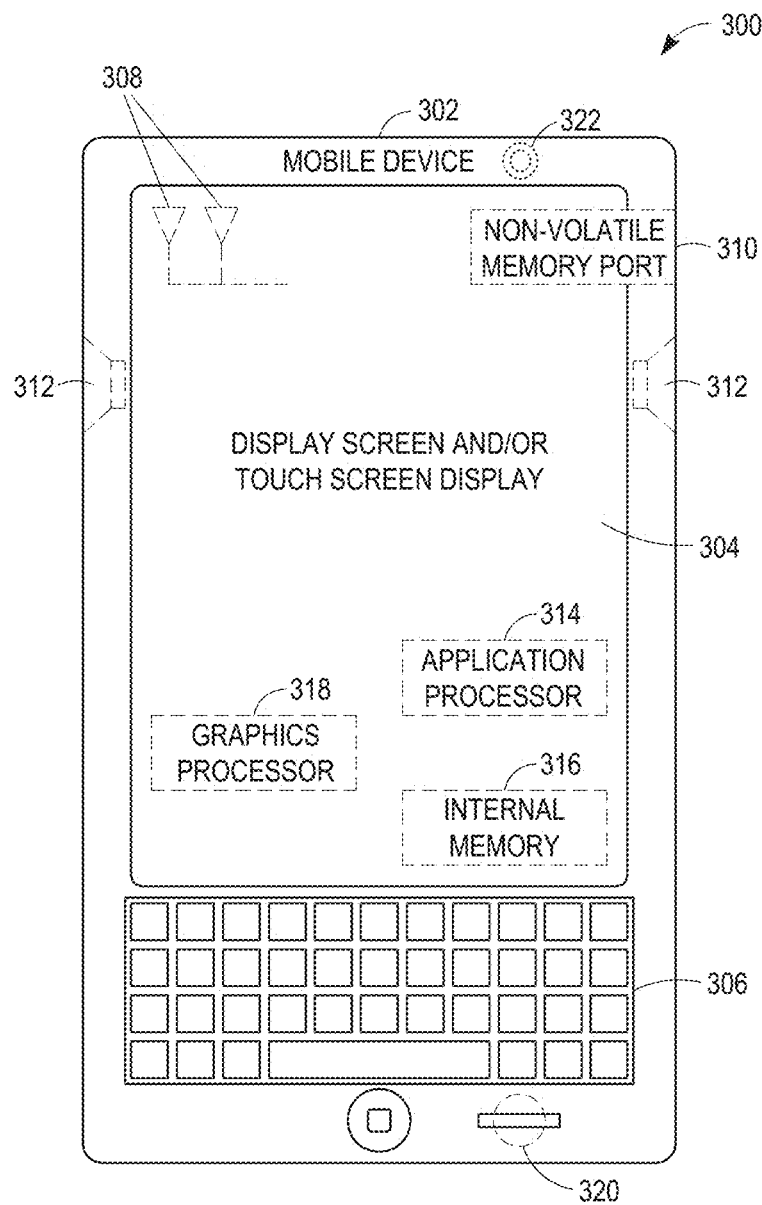
FIG. 3 illustrates an example of a mobile client device on which the configurations and techniques described herein can be deployed.

FIG. 3 illustrates an example of a mobile device 300. The mobile device 300 can be a user equipment (UE), a mobile station (MS), a mobile wireless device, a mobile communication device, a tablet, a handset, or other type of mobile wireless computing device. The mobile device 300 can include one or more antennas 308 within housing 302 that are configured to communicate with a hotspot, base station (BS), an evolved NodeB (eNodeB), or other type of WLAN or WWAN access point. The mobile device 300 can be configured to communicate using multiple wireless communication standards, including standards selected from 3GPP LTE, WiMAX, High Speed Packet Access (HSPA), Bluetooth, and Wi-Fi standard definitions. The mobile device 300 can communicate using separate antennas for each wireless communication standard or shared antennas for multiple wireless communication standards. The mobile device 300 can communicate in a WLAN, a WPAN, and/or a WWAN.

FIG. 3 also shows a microphone 320 and one or more speakers 312 that can be used for audio input and output from the mobile device 300. A display screen 304 can be a liquid crystal display (LCD) screen, or other type of display screen such as an organic light emitting diode (OLED) display. The display screen 304 can be configured as a touch screen. The touch screen can use capacitive, resistive, or another type of touch screen technology. An application processor 314 and a graphics processor 318 can be coupled to internal memory 316 to provide processing and display capabilities. A non-volatile memory port 310 can also be used to provide data input/output options to a user. The non-volatile memory port 310 can also be used to expand the memory capabilities of the mobile device 300. A keyboard 306 can be integrated with the mobile device 300 or wirelessly connected to the mobile device 300 to provide additional user input. A virtual keyboard can also be provided using the touch screen. A camera 322 located on the front (display screen) side or the rear side of the mobile device 300 can also be integrated into the housing 302 of the mobile device 300.

Figure 4:
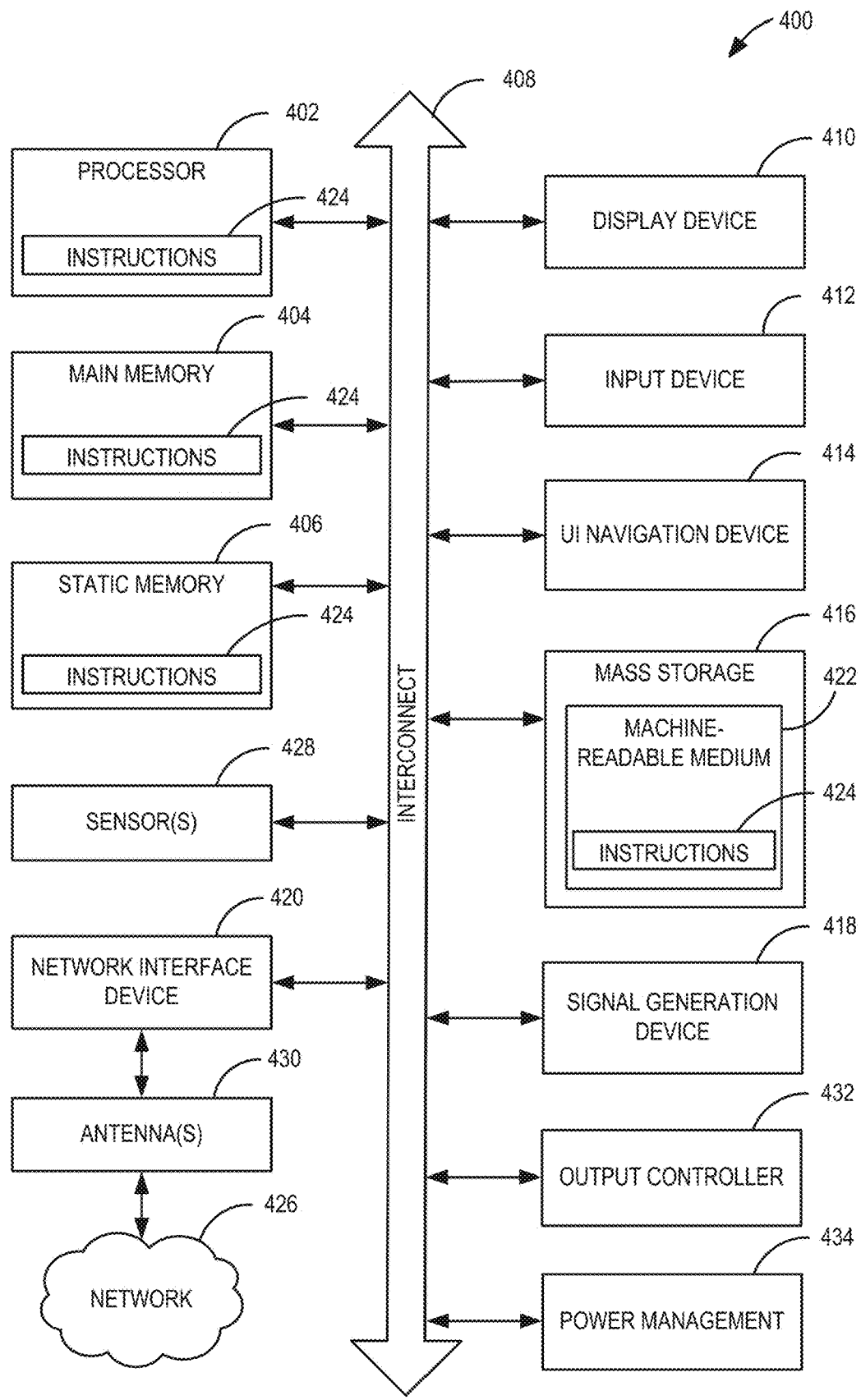
FIG. 4 illustrates an example computer system that can be used as a computing platform for the computing or networking devices described herein.

FIG. 4 is a block diagram illustrating an example computer system machine 400 upon which any one or more of the methodologies herein discussed can be run. Computer system machine 400 can be embodied as the base station 102, the antennas 104, the user equipment 106, or any other computing platform described or referred to herein. In alternative embodiments, the machine operates as a stand-alone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 400 includes a processor 402 (e.g., a central processing unit (CPU), a graphics processing unit (GPU) or both), a main memory 404 and a static memory 406, which communicate with each other via an interconnect 408 (e.g., a link, a bus, etc.). The computer system machine 400 can further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are a touch screen display. The computer system machine 400 can additionally include a storage device 416 (e.g., a drive unit), a signal generation device 418 (e.g., a speaker), an output controller 432, a power management controller 434, and a network interface device 420 (which can include or operably communicate with one or more antennas 430, transceivers, or other wireless communications hardware), and one or more sensors 428, such as a Global Positioning Sensor (GPS) sensor, compass, location sensor, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 can also reside, completely or at least partially, within the main memory 404, static memory 406, and/or within the processor 402 during execution thereof by the computer system machine 400, with the main memory 404, static memory 406, and the processor 402 also constituting machine-readable media.

While the machine-readable medium 422 is illustrated in an example embodiment to be a single medium, the term "machine-readable medium" can include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 424 can further be transmitted or received over a communications network 426 using a transmission medium via the network interface device 420 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 includes the subject matter embodied by a method for selecting at least one parameter for downlink data transmission with a mobile user equipment, the method executable by a wireless communication base station having multiple antennas configured to communicate wirelessly with the mobile user equipment, the method including receiving an uplink probing signal from the mobile user equipment; determining, from the received uplink probing signal, a plurality of angles-of-arrival for a corresponding plurality of paths between the mobile user equipment and the multiple antennas; transmitting, from the multiple antennas, a plurality of downlink probing signals directionally toward corresponding angles-of-arrival in the plurality of angles-of-arrival, each downlink probing signal being a virtual antenna port with respect to the mobile user equipment; receiving, from the mobile user equipment, channel state information; and composing, in response to the received channel state information, at least one of a rank indicator (RI), precoding matrix indicator (PMI), or modulating and coding scheme (MCS) for downlink data transmission to the mobile user equipment.

In Example 2, the subject matter of Example 1 can optionally include wherein each downlink probing signal appears to originate from a different location from the point of view of the mobile user equipment.

In Example 3, the subject matter of one or any combination of Examples 1-2 can optionally include wherein determining, from the received uplink probing signal, a plurality of angles-of-arrival for a corresponding plurality of paths between the mobile user equipment and the multiple antennas includes employing an angle-of-arrival estimation algorithm.

In Example 4, the subject matter of Example 3 can optionally include wherein the angle-of-arrival estimation algorithm: projects the received uplink probing signal toward different spatial signatures spanning the angular space; determines peak values from the projection; and adopts the peak values as estimated angles-of-arrival.

In Example 5, the subject matter of one or any combination of Examples 1-4 can optionally include wherein the uplink probing signal and the downlink probing signals are at different frequencies.

In Example 6, the subject matter of Example 5 can optionally include wherein determining the downlink probing signal, in response to the uplink probing signal, includes: determining an uplink channel vector; multiplying the uplink channel vector by a diagonal matrix to form a product; and adopting the product to be the downlink channel vector.

In Example 7, the subject matter of Example 6 can optionally include wherein the diagonal matrix includes, at the Mth row and column, a complex exponential factor having an exponent that varies as (M−1) multiplied by the difference in frequency between the uplink probing signal and the downlink probing signal.

In Example 8, the subject matter of one or any combination of Examples 6-7 can optionally further include forming a complex transpose of the product; and adopting the complex transpose as a defining vector for downlink virtual channel state information reference signal ports.

In Example 9, the subject matter of one or any combination of Examples 6-8 can optionally further include applying channel state information reference signals on top of the plurality of virtual antenna ports.

In Example 10, the subject matter of one or any combination of Examples 1-9 can optionally further include for virtual antenna ports numbering greater than four, downselecting the virtual antenna ports to a number fewer than four based on channel state information reference signal measurements.

Example 11 includes the subject matter embodied by a wireless communication base station having multiple antennas configured to communicate wirelessly with the mobile user equipment, the wireless communication base station including circuitry configured to: receive an uplink probing signal from the mobile user equipment; determine, from the received uplink probing signal, a plurality of angles-of-arrival for a corresponding plurality of paths between the mobile user equipment and the multiple antennas; transmit, from the multiple antennas, a plurality of downlink probing signals directionally toward corresponding angles-of-arrival in the plurality of angles-of-arrival, each downlink probing signal being a virtual antenna port with respect to the mobile user equipment; receive, from the mobile user equipment, channel state information; and compose, in response to the received channel state information, at least one of a rank indicator (RI), precoding matrix indicator (PMI), or modulating and coding scheme (MCS) for downlink data transmission to the mobile user equipment.

In Example 12, the subject matter of Example 11 can optionally include wherein each downlink probing signal appears to originate from a different location from the point of view of the mobile user equipment.

In Example 13, the subject matter of one or any combination of Examples 11-12 can optionally include wherein determining, from the received uplink probing signal, a plurality of angles-of-arrival for a corresponding plurality of paths between the mobile user equipment and the multiple antennas includes: employing an angle-of-arrival estimation algorithm.

In Example 14, the subject matter of Example 13 can optionally include wherein the angle-of-arrival estimation algorithm: projects the received uplink probing signal toward different spatial signatures spanning the angular space; determines peak values from the projection; and adopts the peak values as estimated angles-of-arrival.

In Example 15, the subject matter of one or any combination of Examples 11-14 wherein the uplink probing signal and the downlink probing signals are at different frequencies.

In Example 16, the subject matter of Example 15 can optionally include wherein determining the downlink probing signal, in response to the uplink probing signal, includes: determining an uplink channel vector; multiplying the uplink channel vector by a diagonal matrix to form a product; and adopting the product to be the downlink channel vector.

In Example 17, the subject matter of Example 16 can optionally include wherein the diagonal matrix includes, at the Mth row and column, a complex exponential factor having an exponent that varies as (M−1) multiplied by the difference in frequency between the uplink probing signal and the downlink probing signal.

In Example 18, the subject matter of one or any combination of Examples 16-17 can optionally include wherein the circuitry is further configured to: form a complex transpose of the product; and adopt the complex transpose as a defining vector for downlink virtual channel state information reference signal ports.

In Example 19, the subject matter of one or any combination of Examples 16-18 can optionally include wherein the circuitry is further configured to: apply channel state information reference signals on top of the plurality of virtual antenna ports.

Example 20 includes the subject matter embodied by a method for selecting at least one parameter for downlink data transmission with a mobile user equipment, the method performed by a wireless communication base station having multiple antennas configured to communicate wirelessly with the mobile user equipment, the method including: receiving an uplink probing signal from the mobile user equipment; employing an angle-of-arrival estimation algorithm; determining, from the angle-of-arrival estimation algorithm, a plurality of angles-of-arrival for a corresponding plurality of paths between the mobile user equipment and the multiple antennas; transmitting, from the multiple antennas, a plurality of downlink probing signals directionally toward corresponding angles-of-arrival in the plurality of angles-of-arrival, each downlink probing signal being a virtual antenna port with respect to the mobile user equipment, each downlink probing signal appearing to originate from a different location from the point of view of the mobile user equipment the uplink probing signal and the downlink probing signals having different frequencies; receiving, from the mobile user equipment, channel state information; and composing, in response to the received channel state information, at least one of a rank indicator (RI), precoding matrix indicator (PMI), or modulating and coding scheme (MCS) for downlink data transmission to the mobile user equipment.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising:

processing circuitry, the processing circuitry configured to:
  decode a first probing signal from a second wireless device, the first probing signal received via a plurality of communication paths;
  in response to receiving the first probing signal, determine a plurality of signal measurements associated with the plurality of communication paths between the wireless device and the second wireless device, wherein each signal measurement of the plurality of signal measurements is associated with a corresponding one of the plurality of communication paths and is determined based on a spatial signature of the corresponding one of the plurality of paths; and
  encode a plurality of second probing signals for transmission to the second wireless device, each probing signal of the plurality of second probing signals encoded for directional transmission to the second wireless device on the corresponding one of the plurality of communication paths, based on the plurality of signal measurements, and wherein the first probing signal and the plurality of second probing signals are configured as beamforming vectors.

2. The apparatus of claim 1, wherein the processing circuitry is further configured to:
  configure each probing signal of the plurality of second probing signals as a virtual antenna port with respect to the second wireless device.

3. The apparatus of claim 2, wherein the processing circuitry is further configured to:
  configure each virtual antenna port based on a discrete Fourier transform (DFT) vector.

4. The apparatus of claim 1, wherein the plurality of signal measurements comprises a plurality of angles-of-arrival corresponding to the plurality of communication paths.

5. The apparatus of claim 4, wherein the processing circuitry is further configured to:
  determine each of the plurality of angles of arrival based on projecting the received first probing signal towards the spatial signature of the corresponding one of the plurality of paths.

6. The apparatus of claim 1, further comprising:
  transceiver circuitry coupled to the processing circuitry; and
  a plurality of antennas coupled to the transceiver circuitry.

7. The apparatus of claim 6, wherein each antenna of the plurality of antennas receives the first probing signal via the corresponding one of the plurality of communication paths.

8. The apparatus of claim 1, wherein to determine the plurality of signal measurements associated with the plurality of communication paths between the wireless device and the second wireless device, the processing circuitry is further configured to:
  employ an angle-of-arrival estimation algorithm.

9. The apparatus of claim 8, wherein based on the angle-of-arrival estimation algorithm, the processing circuitry is further configured to:
  project the received first probing signal toward different spatial signatures spanning an angular space;
  determine peak values from the projection; and
  adopt the peak values as estimated angles-of-arrival for the plurality of signal measurements.

10. An apparatus of a wireless device, the apparatus comprising:
  processing circuitry, the processing circuitry configured to:
    decode a first probing signal from a second wireless device, the first probing signal received via a plurality of communication paths;
    in response to receiving the first probing signal, determine a plurality of signal measurements associated with the plurality of communication paths between the wireless device and the second wireless device, wherein each signal measurement of the plurality of signal measurements is associated with a corresponding one of the plurality of communication paths; and
    encode a plurality of second probing signals for transmission to the second wireless device, each probing signal of the plurality of second probing signals encoded for directional transmission to the second wireless device on the corresponding one of the plurality of communication paths, based on the plurality of signal measurements;
    decode channel state information received from the second wireless device, the channel state information corresponding to a channel associated with one of the plurality of second probing signals; and
    encode; in response to the received channel state information, a rank indicator (RI) and a precoding matrix indicator (PMI) for transmission to the second wireless device.

11. The apparatus of claim 10, wherein the processing circuitry is further configured to:
  compose, in response to the received channel state information, a modulating and coding scheme (MCS) for transmission to the second wireless device, wherein each of the plurality of second probing signals appears to originate from a different location from a point of view of the second wireless device.

12. An apparatus of a mobile communication device, the apparatus comprising:
  processing circuitry coupled to memory, the processing circuitry configured to:
    encode for transmission to a base station (BS), a plurality of channel sounding signals;
    estimate a plurality of angles-of-arrival for a corresponding plurality of paths between the mobile communication device and multiple antennas of the BS based on the channel sounding signals, wherein each of the angles-of-arrival is associated with a corresponding one of the plurality of paths between the mobile communication device and the BS;
    decode a plurality of downlink probing signals received from the multiple antennas of the BS, each downlink probing signal being transmitted directionally toward a corresponding angle-of-arrival of the plurality of the angles-of-arrival, each downlink probing signal being a virtual antenna port with respect to the mobile communication device;
    encode channel state information for transmission to the BS, the channel state information corresponding to a channel associated with one of the downlink probing signals; and
    decode a rank indicator (RI) and a precoding matrix indicator (PMI) for a downlink data transmission from the BS, the RI and the PMI in response to the channel state information.

13. The apparatus of claim 12, wherein the processing circuitry is further configured to:
  determine each of the angles-of-arrival based on projecting the channel sounding signals towards a spatial signature of the corresponding one of the plurality of paths.

14. The apparatus of claim 12, wherein the channel sounding signals and the downlink probing signals are at different frequencies.

15. The apparatus of claim 12, wherein the processing circuitry is further configured to:
 decode a modulating and coding scheme (MCS) for the downlink data transmission from the BS in response to the channel state information, wherein each downlink probing signal appears to originate from a different location from a point of view of the mobile communication device.

16. The apparatus of claim 12, wherein the processing circuitry is further configured to:
 encode the plurality of channel sounding signals for transmission to the BS via a plurality of transmit antennas in a pre-determined manner.

* * * * *